(12) United States Patent
Yoneda et al.

(10) Patent No.: US 6,789,430 B1
(45) Date of Patent: Sep. 14, 2004

(54) SEMICONDUCTOR PRESSURE SENSOR WITH STRAIN GAUGES FORMED ON A SILICON DIAPHRAGM

(75) Inventors: Masayuki Yoneda, Kanagawa (JP); Nobuaki Honda, Kanagawa (JP); Takeshi Fukiura, Kanagawa (JP); Shoji Nagasaki, Kanagawa (JP)

(73) Assignee: Yamatake Corporation, Tokyo (JP)

(*) Notice: Subject to any disclaimer, the term of this patent is extended or adjusted under 35 U.S.C. 154(b) by 0 days.

(21) Appl. No.: 09/913,779

(22) PCT Filed: Feb. 15, 1999

(86) PCT No.: PCT/JP99/00643
§ 371 (c)(1),
(2), (4) Date: Jan. 10, 2002

(87) PCT Pub. No.: WO00/47969
PCT Pub. Date: Aug. 17, 2000

(51) Int. Cl.⁷ .................................................. G01L 9/00
(52) U.S. Cl. ......................................................... 73/754
(58) Field of Search .................. 73/754, 755, 715–727; 438/478, 479, 652, 689, 697; 437/226–238, 901, 921

(56) References Cited

U.S. PATENT DOCUMENTS 4,975,390 A * 12/1990 Fujii et al. .................... 438/53
5,445,975 A    8/1995 Gardner et al. ................ 432/70
5,525,549 A * 6/1996 Fukada et al. ................. 438/53
6,130,010 A * 10/2000 Ishio et al. ..................... 430/5
6,250,165 B1 * 6/2001 Sakai et al. .................... 73/754

FOREIGN PATENT DOCUMENTS

| JP | 3-200335 | 9/1991 |
| JP | 3-238875 | 10/1991 |
| JP | 6-216137 | 8/1994 |

* cited by examiner

Primary Examiner—William Oen
(74) Attorney, Agent, or Firm—Blakely, Sokoloff, Taylor & Zafman

(57) ABSTRACT

A semiconductor pressure sensor is presented. The pressure sensor includes a silicon substrate with a diaphragm that produces a distortion depending on the pressure. Strain gauges are provided on the main surface side of the silicon substrate with the diaphragm and are formed by conductive diffusion resistors different from the substrate. A getter is provided on the main surface side of the silicon substrate including the periphery of the strain gauges adjacent to the strain gauges. The getter includes the PN-junction area to which reverse bias is impressed so that the metal impurities of at least an Fe atom that are contained in the silicon substrate may be captured.

7 Claims, 5 Drawing Sheets

SEMICONDUCTOR PRESSURE SENSOR WITH STRAIN GAUGES FORMED ON A SILICON DIAPHRAGM

BACKGROUND

1. Field

This invention relates to a semiconductor pressure sensor. More specifically, the present invention is directed to a semiconductor pressure sensor of the type that uses strain gauges formed on a silicon diaphragm.

2. Background

Conventionally, a semiconductor pressure sensor using strain gauges is known. The pressure sensor forms a pressure-sense diaphragm on a silicon substrate. And, sensor elements (piezo-resistive devices) comprised by diffusion resistor layers are provided on the pressure-sense diaphragm. The variation of a pressure is measured by the detection of the distortion in the diaphragm.

FIG. 7 is a perspective diagram showing a semiconductor pressure sensor using conventional strain gauges. A part of the pressure sensor is shown by the cross section view. As shown in FIG. 7, sensor chip 200 is made by silicon base 101, which has diaphragm 110, and sensor elements on diaphragm 110. Diaphragm 110 provides the whole center section of silicon base 101 with a thin film, excluding a circumference part. Wheatstone Bridge circuit 113 is comprised by strain gauges 105a–105d made from diffusion resistors, metal wiring 103, and terminals 104a–104d.

FIG. 8 is a circuit diagram showing Wheatstone Bridge circuit 113 based on FIG. 7. As shown in the diagram, strain gauges 105a–105d made from diffusion resistors are respectively connected by metal wiring 103. Terminals 104a–104d are provided between each strain gauge. Terminal 104a is connected to a power supply (high potential side). Moreover, terminal 104c is connected to a ground (low potential side). Therefore, a variation of resistance in strain gauges 105a–105d is performed by the deformation of diaphragm 110 of FIG. 7. The voltage value between terminals 104b and 104d varies. The variation of a pressure is measured by the detection of change in voltage.

In the meantime, sensor chip 200 is fixed on pedestal 111, such as Pyrex®glass. And, sensor chip 200 is sealed in a package together with a silicon sealing liquid. Pedestal 111 provides through-hole 112 for extracting air. Sensor chip 200 is attached so that through-hole 112 may be covered. The silicon sealing liquid (not illustrated) is maintained on diaphragm 110. The sensor elements on diaphragm 110 (each member which comprises Wheatstone Bridge circuit 113) is isolated from an external field. Therefore, the variation of a pressure is transmitted to the sensor elements via the silicon sealing liquid.

[Problem to be solved]

The pressure sensor (as shown above) needs a fine pattern process on the silicon substrate for formation of the diaphragm and the diffusion resistors, and is made from the semiconductor manufacturing process, which must be considered sufficiently dustproof. However, even though the present clean room provides means for preventing dust, a trace metal-impurity enters into a wafer or is generated midway through a process. As a result, the metal-impurity may bring on a fluctuation in a sensor output.

In general, when various semiconductor devices, such as MOSFET or the like, are manufactured, a removal in the influence of a device, etc. is performed by capturing the metal-impurity during the manufacturing process of the wafer. This is called gettering. From the difference in the principle, it is classified into a EG (extrinsic gettering) method and a IG (intrinsic gettering) method. The EG method is the technique that roughens a wafer back-side using a sandblasting method, etc. to collect the impurity in the roughened-surface. The IG method is the technique that makes many micro defects inside the wafer by precipitates of oxygen to capture the impurity in the micro defects.

However, the semiconductor pressure sensor with the structure that provides the strain gauges on the diaphragm etches most silicon-substrate back-sides to form the diaphragm. For this reason, even though gettering is performed in the wafer using the conventional EG and IG methods, a getter reduces at the time of a formation of the diaphragm. Therefore, it becomes difficult to capture the impurity sufficiently. Moreover, a new process for making the getter is required. There is also a problem that an effect changes with varieties of the wafer (a bare substrate, SOI (Silicon On Insulator) substrate, epitaxial substrate, etc.).

[Means for solving the problem]

The invention is made in order to solve the above-mentioned problem, and an object of the present invention is to provide a semiconductor pressure sensor in which fluctuation in a sensor output is difficult to be produced.

A semiconductor pressure sensor, according to the present invention, comprises Silicon substrate (1) with diaphragm (10) that produces a distortion depending on a pressure, strain gauges (5a, 5b, 5c, 5d) that are provided on diaphragm (10) and are formed by diffusion resistors, and a PN-junction area that is provided adjacent in strain gauges (5a, 5b, 5c, 5d) and that the reverse bias is applied to.

The PN-junction area may comprise the boundary surface between silicon base (1) and diffusion layer (8) provided in silicon base (1).

Diffusion layer (8) may be locally provided near strain gauges (5a, 5b, 5c, 5d).

A plural pair of strain gauges (5a, 5b, 5c, 5d) may be provided.

Plural strain gauges (5a, 5b, 5c, 5d) may form Wheatstone Bridge circuits.

The PN-junction area may be provided only in strain gauge (5c) at the side of the large electrical potential difference with a substrate potential among terminal (4a) at the side of a high electric potential in the Wheatstone Bridge circuit and the terminal at the side of low potential (4c).

Diffusion layer (8) may be formed of the combination of the plural long and slender patterns that are acutely angled toward strain gauges (5a, 5b, 5c, 5d).

DETAILED DESCRIPTION

Hereafter, the preferred embodiments of the present invention will be explained in detail.

The inventors of the present application performed various experiments to develop a semiconductor pressure sensor that does not have a fluctuation in an output. As a result, the inventors discovered that the fluctuation of a sensor output was brought on by an Fe (iron) atom among a number of metal-impurities. That is, it is found that an Fe atom in a sensor chip is drawn to PN junctions such as a diffusion resistor resulting in producing a leak current or change in resistance value. If the metal-impurity represented by an Fe atom exists in active Si (silicon), it will be easy to narrow a band gap to excite an electron. And furthermore, when movable ions, such as Na (natrium), are interposed under bias application at high temperature, movement of an electron is promoted resulting in the fluctuation.

Therefore, the fluctuation conditions of the sensor output are as follows:(1) existence of a metal-impurity, such as an Fe atom; (2) existence of movable ions, such as Na; (3) the temperature is 125° C. or more; and (4) application of a bias potential. The fluctuation is produced when these four conditions are satisfied.

However, an Fe atom is hardly included in a usual CZ (Czochralski) wafer that is used. When a device is formed in a wafer, an Fe atom is considered to enter in the wafer. In the manufacture apparatus, iron and SUS (stainless alloy) are used in all parts. Even a pincette is made from SUS. Therefore, in all processes, an Fe atom is considered to adhere to the wafer and to diffuse inside the wafer at various heat processes. Of course, although a precision cleaning in a furnace is performed before a heat process of the wafer in general, it is difficult to remove completely. This is similar also to an Na atom. There is a possibility that it may enter from all places, such as the human being's skin surface and perspiration. A complete removal is difficult.

Therefore, the inventors developed a semiconductor pressure sensor with the getter for capturing a metal-impurity, considering the above facts.

Embodiment 1

Figure 1:
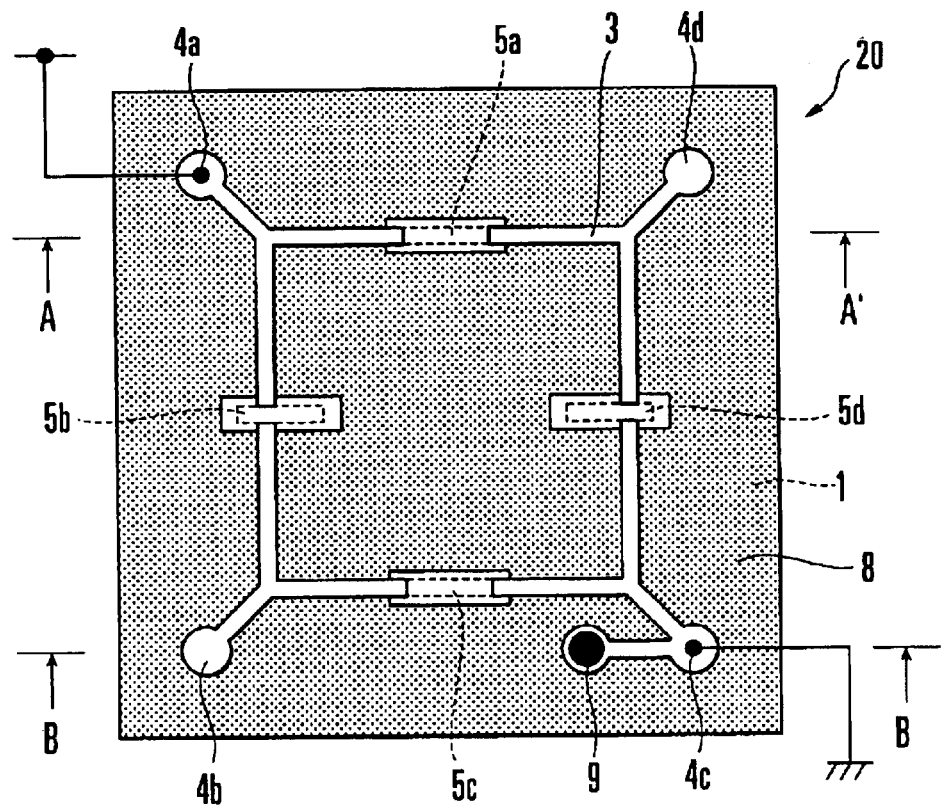
FIG. 1 is a top view showing a semiconductor pressure sensor according to Embodiment 1 of the present invention.

FIG. 1 is a plan showing a semiconductor pressure sensor according to Embodiment 1. As shown in FIG. 1, sensor chip 20 is made by n type silicon base 1. The whole center section except the circumference part of silicon base 1 comprises diaphragm 10 of a thin film. Diaphragm 10 is provided with strain gauges 5a–5d made by p type diffusion resistors, lead portion 6 formed by the p+type diffusion resistors, metal wiring 3, and terminals 4a–4d made from a metal. In this way, a Wheatstone Bridge circuit is formed from the above-mentioned components. When silicon base 1 is an n type substrate, a diffusion resistor is formed by thermal diffusion or ion implantation of a boron or the like.

Figure 2A:
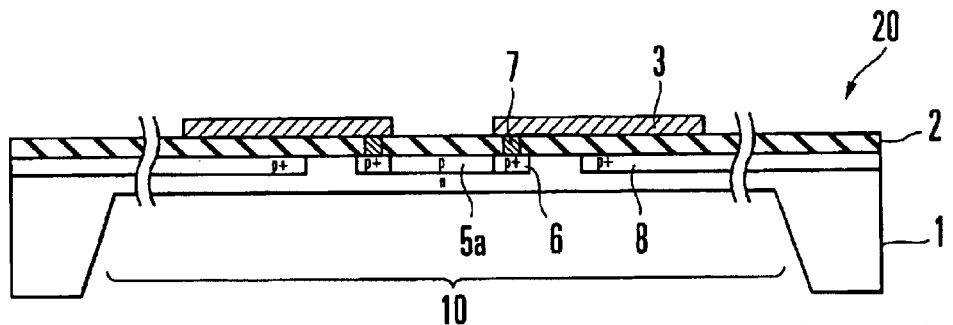
FIG. 2A is a sectional view taken in line A–A' in FIG. 1.
Figure 2B:
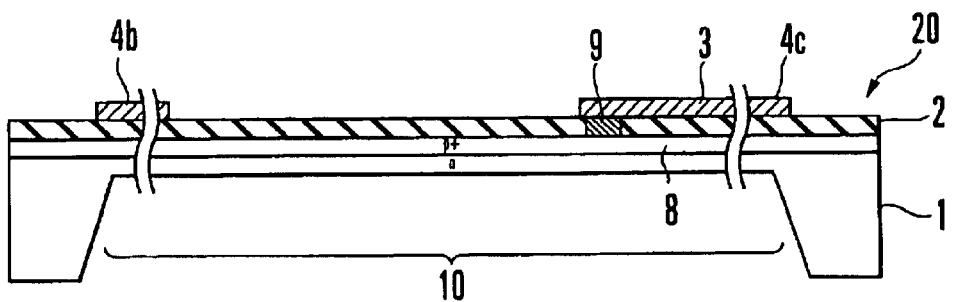
FIG. 2B is a sectional view taken in line B–B' in FIG. 1.

FIG. 2A is a sectional view along A–A' line of FIG. 1. FIG. 2B is a sectional view along B–B' line of FIG. 1. As shown in FIG. 2A, the main surface of silicon base 1 is provided with strain gauge 5a made from a p type diffusion layer, lead portion 6 is made from a p+type diffusion layer dose to strain gauge 5a, and getter 8 made from a p+type diffusion layer close to lead portion 6.

And, layer-insulation film 2 made from SiO2 is provided on the main surface of silicon base 1. Metal wiring 3, the terminal, etc. which comprise one part of such a Wheatstone Bridge circuit, are provided on the layer-insulation film 2. Lead portion 6 is electrically connected with strain gauge 5a.

Furthermore, lead portion 6 is connected with metal wiring 3 via through-hole electrode 7 provided in layer-insulation film 2. Moreover, as shown in FIG. 2B, getter 8 is connected with metal wiring 3 via through-hole electrode 9 provided in layer-insulation film 2. And, a reverse bias is applied to getter 8 via terminal 4c.

Thus, in this embodiment, getter 8, which has PN reverse bias potential, is provided in the vicinity of strain gauges 5a–5d. Therefore, the metal-impurities in silicon base 1 (Fe atom, Na atom, etc.) are captured in a PN-junction area. In this way, the variation of the resistivity and the development of the leak current in strain gauges 5a–5d are prevented.

Embodiment 2

Figure 3:
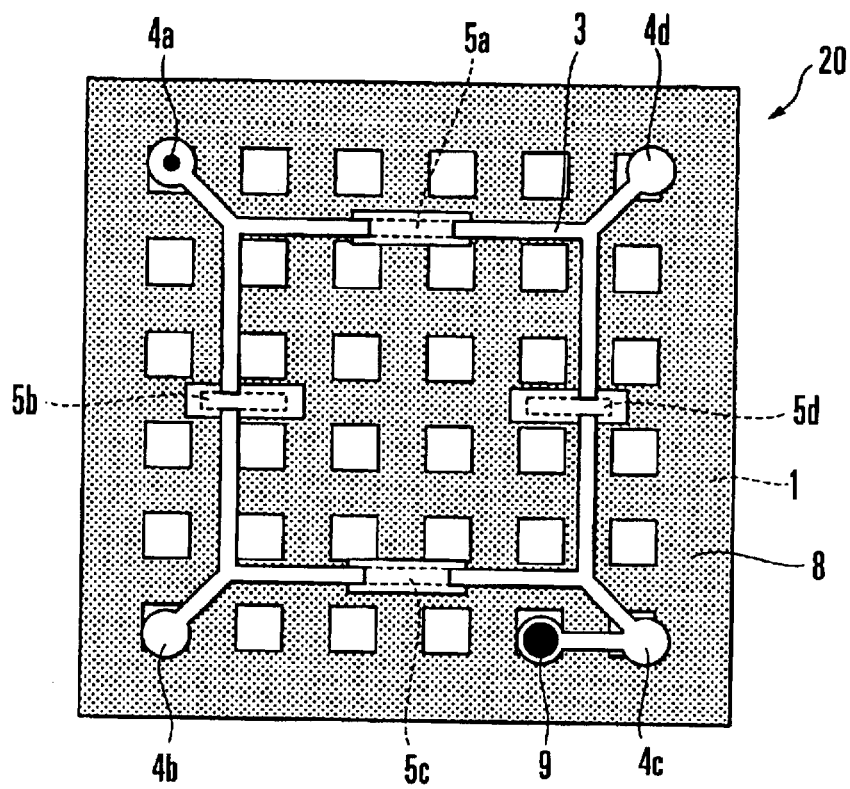
FIG. 3 is a top view showing Embodiment 2 of the present invention.

FIG. 3 is a top view showing a semiconductor pressure sensor according to Embodiment 2 of the present invention. Getter 8 is made into the mesh-like layout as shown in the diagram. Therefore, since a contact area of p+type getter 8 and n type silicon substrate 1 increase, namely, a PN-junction area is expanded, a gettering effect improves.

Embodiment 3

Figure 4:
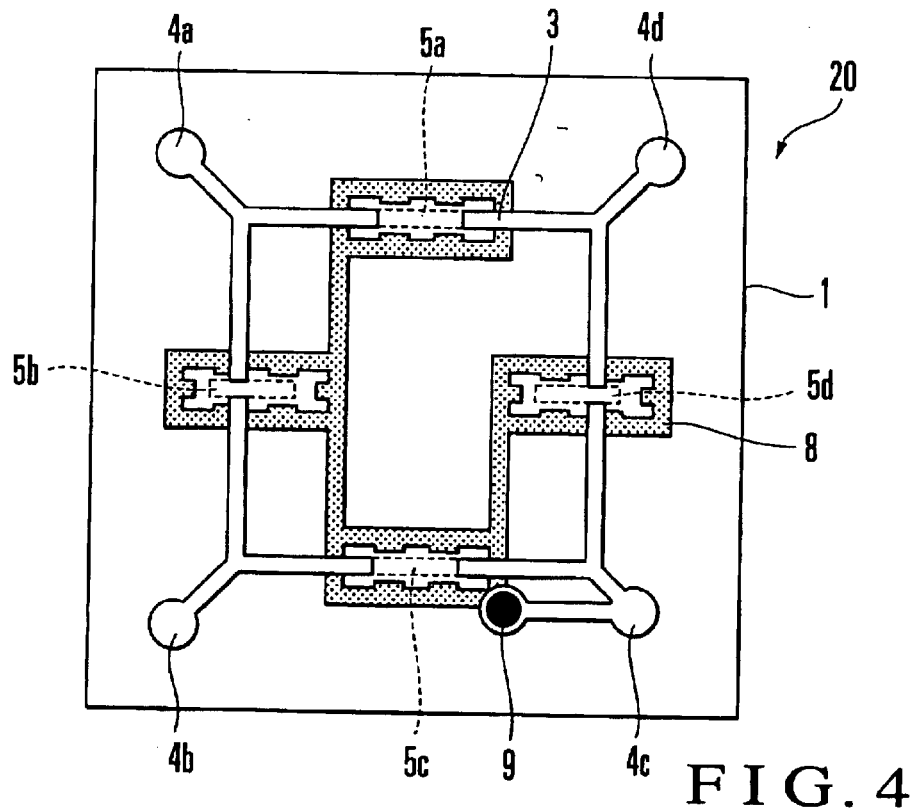
FIG. 4 is a top view showing Embodiment 3 of the present invention.

FIG. 4 is a top view showing a semiconductor pressure sensor according to Embodiment 3 of the present invention. As shown in FIG. 4, getter 8 is locally provided only on the periphery of strain gauges 5a–5d. Although getter 8 in FIGS. 1 and 3 was provided over the main surface of silicon substrate 1, a leak current increases with this formation so that there is a possibility that the power consumption of the entire chip may increase. Therefore, getter 8 was locally provided on the periphery of strain gauges 5a–5d such as in this embodiment. Of course, each getter is electrically connected with terminal 4c via through-hole electrode 9. Therefore, PN reverse bias is applied to any getter.

In addition, in FIG. 4, although each getter is connected by using an identical diffusion layer, instead of connecting by the diffusion layer, the metal wiring may be provided on silicon substrate 1. Moreover, although the layout of getter 8 is made into the shape of mesh, this invention includes the layout of the getter that is not made into the shape of mesh, such as in Embodiment 1.

Embodiment 4

Figure 5:
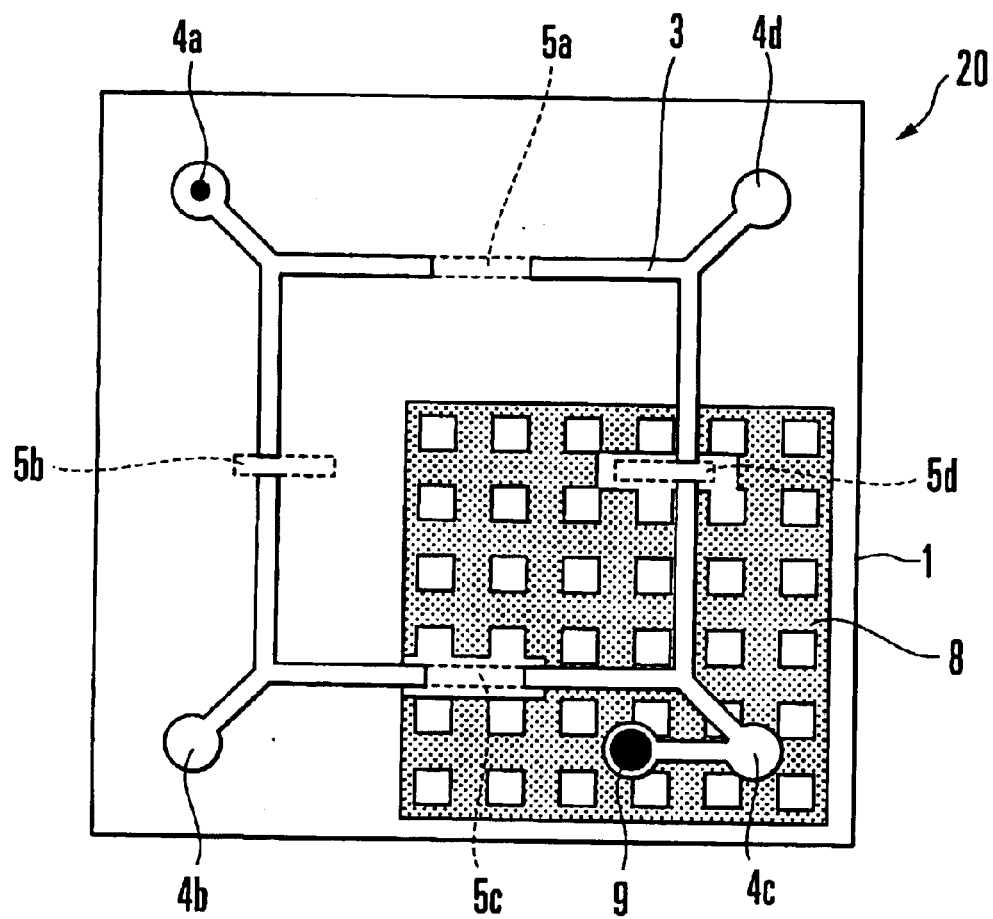
FIG. 5 is a top view showing Embodiment 4 of the present invention.

FIG. 5 is a top view showing a semiconductor pressure sensor according to Embodiment 4 of the present invention. As shown in FIG. 5, a getter 8 is provided only on the periphery of strain gauges 5c and 5d near a ground side. A metal-impurity, such as iron, has positive ions. Therefore, it can be easy to draw to a portion with a large reverse bias to a substrate potential, i.e., sensor element of the ground side. If getter 8 is more than required and is provided as mentioned above, problems such as the increase of a leak current will be caused. Consequently, the increase of the power consumption of the entire chip can be prevented by providing the necessary minimum of getter in the ground side (low potential side).

In addition, although the layout of getter 8 is made in the shape of mesh, this invention includes the layout of the getter, which is not made in the shape of mesh such as in Embodiment 1.

Embodiment 5

Figure 6A:
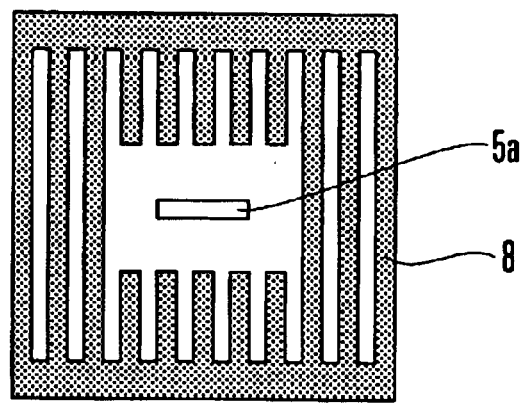
FIGS. 6A, 6B, and 6C are the top views showing Embodiment 5 of the present invention.
Figure 6B:
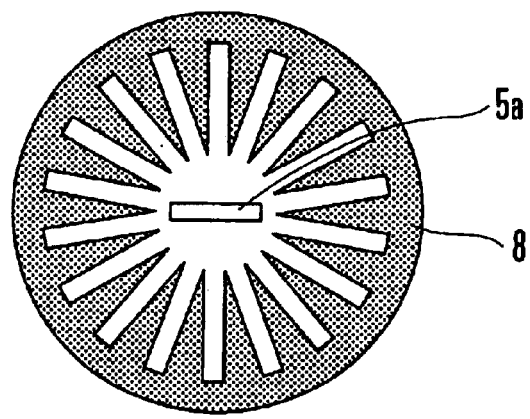
Figure 6C:
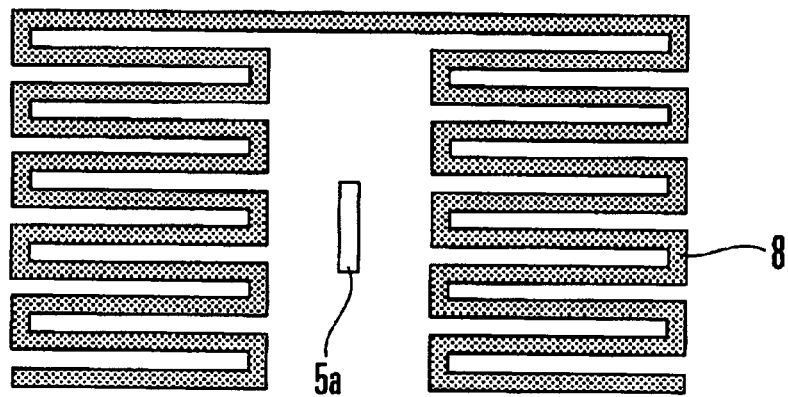
Figure 7:
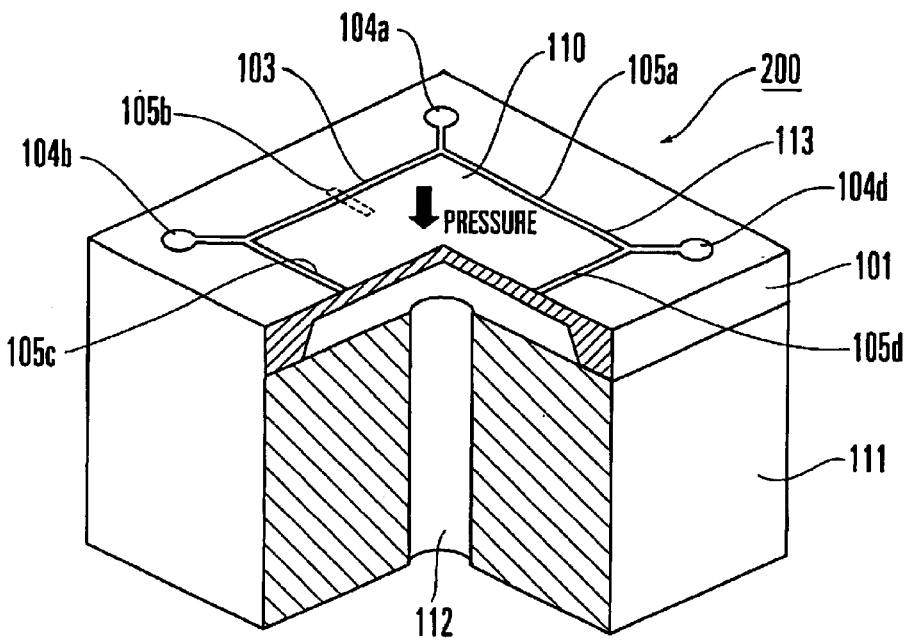
FIG. 7 is a perspective diagram showing a conventional semiconductor pressure sensor.
Figure 8:
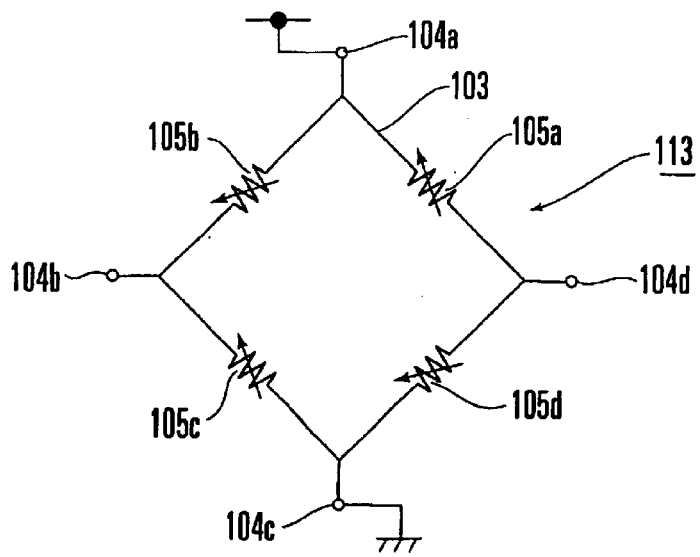
FIG. 8 is a circuit diagram showing a Wheatstone Bridge circuit formed on the diaphragm of FIG. 7.

FIG. 6A, 6B, and 6C are the top views showing a semiconductor pressure sensor according to Embodiment 5 of the present invention. In FIG. 6A, 6B, and 6C, a getter has a plurality of the long and slender pattern, which is acutely angled toward a strain gauge. It is found that an Fe atom can be drawn to the edge of a diffusion resistor, i.e., PN-junction area. Consequently, it is effective if the layout of getter 8 is performed so that PN-junction area can be increased to the strain gauge as shown in FIGS. 6A, 6B, and 6C.

As explained in the five embodiments, the present invention can capture the metal-impurity in a silicon substrate to prevent a leak current from being generated by the work of the PN-junction area provided in the diaphragm.

What is claimed is:

1. A semiconductor pressure sensor comprising:
    a silicon substrate (1) with a main surface side and a diaphragm (10) which produces a distortion depending on a pressure;
    strain gauges (5*a*, 5*b*, 5*c*, 5*d*) which are provided on the main surface side of the silicon substrate (1) with the diaphragm (10) and are formed by conductive diffusion resistors different from said substrate; and
    a getter (8) which is provided on the main surface side of the silicon substrate (1) including a periphery of the getter adjacent to said strain gauges (5*a*, 5*b*, 5*c*, 5*d*)
    said getter comprising the PN-junction area to which reverse bias is impressed so that metal impurities may be captured which are contained in the silicon substrate, and which contain at least an Fe atom.

2. A semiconductor pressure sensor claimed according to claim 1, wherein
    the PN-junction area comprises the boundary surface between the silicon substrate (1) and a diffusion layer (8) provided in the silicon substrate (1).

3. A semiconductor pressure sensor according to claim 2, wherein the diffusion layer (8) is locally provided near the strain gauges (5*a*, 5*b*, 5*c*, 5*d*).

4. A semiconductor pressure sensor according to claim 1, wherein a plurality of the strain gauges(5*a*, 5*b*, 5*c*, 5*d*) are provided.

5. A semiconductor pressure sensor according to claim 4, wherein a plurality of the strain gauges(5*a*, 5*b*, 5*c*, 5*d*) form a Wheatstone Bridge circuit.

6. A semiconductor pressure sensor according to claim 5, wherein
    the PN-junction area is provided only in the strain gauge (5*c*) at the side of the large electrical potential difference with a substrate potential among a terminal (4*a*) at the side of a high electric potential in the Wheatstone Bridge circuit and the terminal at the side of a low potential (4*c*).

7. A semiconductor pressure sensor according to claim 2, wherein the diffusion layer (8) is formed of the combination of the multiple long and slender patterns which is an acute angle toward the strain gauges(5*a*, 5*b*, 5*c*, 5*d*).

* * * * *